United States Patent [19]
Montesi et al.

[11] Patent Number: 5,100,183
[45] Date of Patent: Mar. 31, 1992

[54] PIPE COUPLING

[75] Inventors: Robert P. Montesi; Gerald L. Anderson, both of Bradford; Phillip E. Frair, Singlehouse, all of Pa.

[73] Assignee: Dresser Industries, Inc., Dallas, Tex.

[21] Appl. No.: 701,356

[22] Filed: May 10, 1991

Related U.S. Application Data

[63] Continuation of Ser. No. 441,369, Nov. 21, 1989, abandoned.

[51] Int. Cl.⁵ .............................................. F16L 17/06
[52] U.S. Cl. ................................... 285/337; 285/323; 285/372; 285/348
[58] Field of Search ............... 285/337, 368, 322, 323, 285/413, 348, 372

[56] References Cited

U.S. PATENT DOCUMENTS

| 342,659 | 5/1886 | Westinghouse, Jr. | 285/337 X |
|---|---|---|---|
| 931,171 | 8/1909 | Williams | 285/372 X |
| 2,220,986 | 11/1940 | Bartell | 285/337 X |
| 2,461,828 | 2/1949 | Lomelino | 285/2 |
| 2,474,880 | 7/1949 | Woodling | 285/86 |
| 2,779,610 | 1/1957 | Risley | 285/323 |
| 2,787,479 | 4/1957 | Burns | 285/232 |
| 3,547,471 | 12/1970 | Dunmire | 285/337 |
| 3,684,322 | 8/1972 | Kotsakis | 285/343 |
| 4,070,046 | 1/1978 | Felker et al. | 285/337 |
| 4,119,335 | 10/1978 | Rieffle et al. | 285/337 |
| 4,569,542 | 2/1986 | Anderson et al. | 285/337 |
| 4,602,810 | 1/1986 | Balb, Jr. et al. | 285/337 X |
| 4,721,330 | 1/1988 | Woodhouse | 285/337 X |

FOREIGN PATENT DOCUMENTS

| 2726035 | 6/1977 | Fed. Rep. of Germany | 285/337 |
|---|---|---|---|
| 1201165 | 12/1959 | France | 285/337 |
| 0551006 | 2/1943 | United Kingdom | 285/337 |

Primary Examiner—Dave W. Arola
Attorney, Agent, or Firm—Daniel Rubin

[57] ABSTRACT

A pipe coupling for the joining of plain end pipe that includes an annular gasket and a compressible lock ring at each end of the coupling between a tubular middle ring and an annular follower. Bolts extending between the opposite followers are effective when tightened to compress both the gasket and lock ring into their operative relation for sealing and gripping a coupled pipe end, respectively. The follower is comprised of a unitary structure integrally cast to define an internal annular protuberance that juxtaposedly confronts the radially rearward surface of the gasket. Also defined by the follower inward of the protuberance is a central opening at least partially tapered frusto-conically and in which the lock ring is initially supported controllably spaced from the gasket. Tightening of the bolts enables gasket sealing pressure to be achieved about the pipe end sequentially before a completed restraing grip on the pipe end is attained by the lock ring.

4 Claims, 1 Drawing Sheet

PIPE COUPLING

This application is a continuation of application Ser. No. 07/441,369, filed Nov. 21, 1989, now abandoned.

FIELD OF THE INVENTION

The field of art to which the invention pertains includes the art of pipe joints and pipe couplings.

BACKGROUND OF THE INVENTION

Pipe couplings are commercially available from a variety of manufacturing sources and are used extensively for underground pipe installations as in the distribution of natural gas. It is known in such couplings to employ gripping members of sorts in order to prevent in-service uncoupling of the joint by longitudinal drawbar forces imposed on the coupled pipe section. Reliability is essential in the construction of such couplings while cost of fabrication is essential to the well being of the manufacturer for competing pricewise in the markets in which the couplings are sold.

With the advent of plastic pipe and tubing and their approval by regulating governmental agencies for natural gas transmission, the previous problem of pipe pullout from a coupled joint increased many times over to on the order of tenfold as compared to metal pipe. One factor most contributing to this problem is the much greater linear coefficient of thermal expansion for plastic pipe as compared to steel pipe. By way of example, Aldyl "A" polyethylene piping marketed by Dupont has a linear coefficient of thermal expansion stated by the manufacturer to be: $9 \times 1^{-5}$ in/in. F.° as compared to $6.5 \times 10^{-6}$ in/in. F.° for steel pipe. Notwithstanding, government agencies regulating installation of such systems require that each joint sustain the longitudinal pullout or thrust forces caused by contraction or expansion of the piping or by anticipated external or internal loading to within prescribed limits. (Title 49, Section 192, "Transportation of Natural and Other Gas by Pipeline-Minimum Safety Regulations" - Fed. Vol. 35, No. 161).

While the degree of pipe restraint or lockup imposed on the coupled joint is critical, it is at least equally critical that adequate gasket compression be achieved about the coupled pipe in the course of coupling installation to insure a seal against leakage of line content.

DESCRIPTION OF THE PRIOR ART

A typical bolt type coupling construction utilized in the prior art for natural gas service as disclosed for example in U.S. Pat. No. 2,779,610 comprises the combination of a gasket to effect sealing and a lock ring to restrain the pipe against pullout. Such couplings are operationally characterized by a grip imposed on the pipe by the lock ring that normally occurs before or substantially simultaneous with attainment of the required gasket pressure for sealing.

To the extent pipe grip by the lock ring occurs before gasket pressure is achieved, some slight displacement of the pipe ends may occur relative to each other in the course of completing the gasket seal. There are, however, certain installations where, for example, the pipe ends are abutting or restrained such as at a final tie-in that precludes pipe displacement to enable completion of the gasket seal. In those situations, should prior coupling construction effect lockup before the required gasket seal is achieved about the coupled pipe, the required gasket seal can never be achieved, and the fact that it has not been achieved could readily go unnoticed. That is, the workman installing the coupling in some remote ditch may be unaware of the lack of gasket seal, and which condition may not be recognized until long after the pipeline is completed and buried. Even a preliminary test may not reveal the condition since a partial but incomplete seal is known to appear adequate on initial test. It can be appreciated that where the line content is natural gas or the like, the potential explosion hazard presented by leaks can be horrendous.

In recognition of the foregoing, U.S. Pat. No. 4,569,542, incorporated herein by reference, discloses an initial axial clearance of controlled dimension between the backface of the gasket and the front face of the lock ring. By virtue of the clearance, bolt tightening enables gasket sealing pressure to be achieved about the coupled pipe sequentially prior to an effective grip on the pipe being attained by the lock ring.

OBJECTS OF THE INVENTION

It is therefore an object of the invention to effect an improved pipe coupling construction of the bolted lock type able to effect both adequate gasket pressure and pipe lockup even where movement of the pipe ends is otherwise restrained.

It is a further object of the invention to effect the previous object with an improved more reliably operative construction than previously utilized therefor.

It is a still further object of the invention to effect the foregoing objects with a less costly construction as compared to prior constructions utilized therefor.

SUMMARY OF THE INVENTION

The invention relates to an improved pipe coupling of the bolted lock type for use on pipelines carrying high pressure combustible gas as to enable both a lock grip and gasket pressure to be achieved reliably in accordance with prescribed standards of installation. More specifically, the invention relates to such a pipe coupling of improved structure affording enhanced operability and lower fabrication cost compared to similar purpose couplings of the prior art.

The foregoing is achieved in accordance with the invention by a coupling construction that includes an annular gasket and a compressible lock ring at each end of the coupling between the middle ring and an annular follower. The backface of the gasket is constructed having a smooth contour which when gasket is uncompressed is positioned to afford a controlled axial clearance adjacent the juxtaposed confronting face of the lock ring thereat. For engaging the gasket, the followers are each of unitary contruction, preferably cast, having a single wall defining an annular protuberance integrally formed and located radially outward along their inside face. The inside face of the protuberance includes an annulus that terminates at a radial shoulder which cooperates with the annulus to define an annular gasket seat. The seat is cross-sectionally configured to generally complement the outward end surface of the gasket. Radially inward and axially rearward of the seat, the axially internal follower wall defines a frusto-conical central opening in which the uncompressed lock ring is initially received. When installation is to be effected by tightening the follower bolts, the protuberance engaging the gasket effects timely compression of the gasket before lockup is achieved.

The above-noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 1:
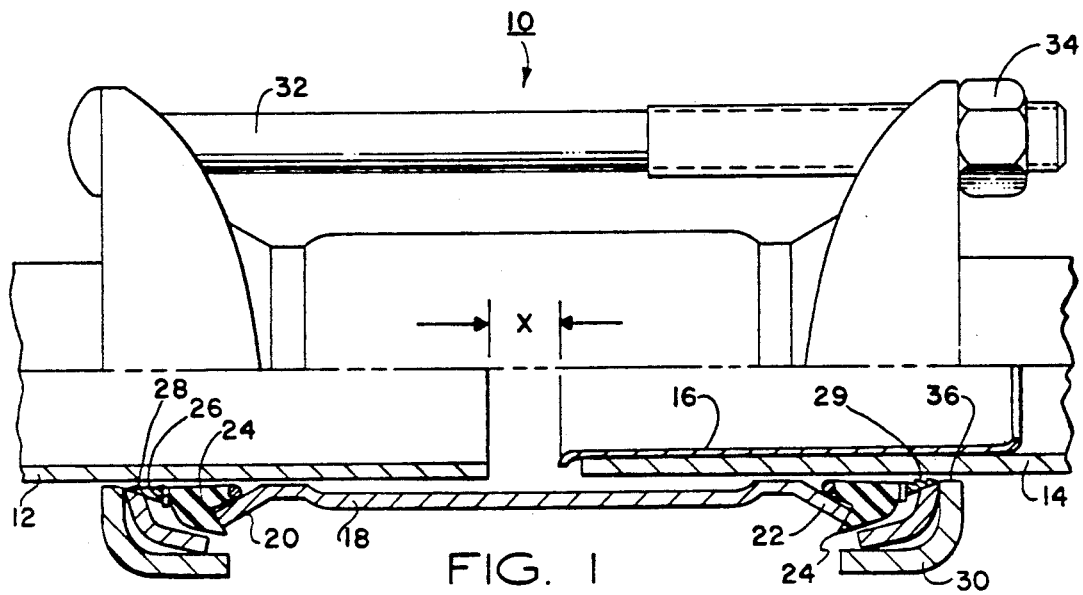
FIG. 1 is a plan view partially sectioned of a first prior art bolted lock type pipe coupling with the components in their pre-installation relations.

In the description which follows like parts are marked throughout the specification and drawings with the same reference numerals, respectively. The drawing figures are not necessarily to scale and the proportions of parts in certain views may have been exaggerated for purposes of clarity.

Referring first to FIG. 1, there is shown a coupling 10 in accordance with the prior art adapted to couple pipe ends 12 and 14, one or both of which may be either of steel or plastic composition. As shown, pipe end 14 is of plastic composition and for which there is provided the customary steel insert 16 to insure against pipe collapse in the course of installing the coupling.

Comprising coupling 10 is a tubular middle ring 18 outwardly flared at each of its ends 20 and 22 for receiving an annular elastomeric gasket 24. Contiguously behind each gasket is an annular backup ring 26 engaged by an arcuate lock ring 28 toothed about its inner surface 29 and split about its circumference (not shown). Containing gasket 24 and lock ring 28 in position at each end of the middle ring is a pair of double wall followers 30 jointed together by a plurality of longitudinal bolts 32 and companion nuts 34. Each follower includes a bevel shaped central opening 36 encircling the received pipe end and engaging the outer tapered surface of lock ring 28 thereat.

To form and install the coupled joint of FIG. 1, nuts 34 are tightened on bolts 32 which draw the opposite followers 30 toward each other. In the course of installation each lock ring 26 is compressed inwardly about the pipe end, while each gasket 24 is compressed for effecting a pressure tight seal. Typically for gas distribution piping, nuts 34 are torqued to a recommended standard of about 80 ft/lbs. As previously noted supra, the grip of lock rings 28 against the pipe ends 12 and 14 normally occurs before or substantially simultaneous with achieving the required degree of sealing force imposed by gaskets 24. To the extent, however, that the intended degree of ring grip occurs prior to the required gasket force being achieved, the pipes will incur a degree of axial displacement toward each other in the course of completing the gasket seal as permitted by the original pipe separation spacing X. Should, however, spacing X be non-existent or insufficient as where the pipe ends are originally in abutting relationship, etc., it can be appreciated that displacement of the pipes to enable achieving gasket pressure would be precluded. Further torque applied to the bolts under those circumstances will only be transmitted to the end faces of the pipe rather than to the gasket as intended. Consequently, the foregoing can result in an undetectable but inadequate gasket seal which even if sufficient to pass an initial pressure test can likely incur leakage subsequently as the gasket relaxes with age.

Figure 2:
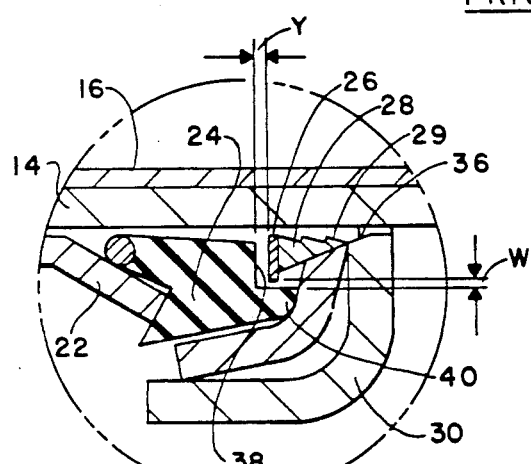
FIG. 2 is a fragmentary enlargement of a second prior art bolted lock type pipe coupling with the components in their preinstallation relation.

Referring now to FIG. 2, there is illustrated another prior art coupling embodiment which may be of a type disclosed in U.S. Pat. No. 4,569,542. It will be understood that the coupling of FIG. 2 is similar to the prior art coupling of FIG. 1 except with respect to those features as will be specifically discussed. In this arrangement, gasket 24 includes an annular axially extending central recess 38 formed in its backface. That results in an annular outer rib 40 extending axially rearward toward engagement against the inside face of follower 30 thereat. When initially assembled on the pipe ends as seen as FIG. 2, an axial clearance of dimension Y exists between the radial face of the gasket and the parallel confronting face of the backup ring 26. At the same time, an annular radial clearance of dimension W initially exists between the O.D. of the backup ring and the I.D. of the recess defined by rib 40.

With this relationship maintained, initial contact during installation between the gasket and the inside face of the followers occurs only with respect to rearwardly extending rib 40. As the followers are drawn toward each other by tightening of nuts 34, rib 40 and the remainder of the gasket continues to be compressed until a recommended 80 ft/lb. tightening torque is reached. Concomitantly therewith, movement of the followers first displace backup ring 26 and lock ring 28 further into the gasket recess 38. At such time as deformation of the gasket begins to distend rearwardly toward the follower, lock ring 26 is pushed away by the deforming gasket down the incline surface of tapered follower opening 36. This causes ring 28 to collapse circumferentially until a grip lock penetration is achieved with the encircled pipe wall. Because ring 28 is initially of a split construction with a void (not shown), backup ring 26 maintains gasket confinement and avoids undesirable gasket penetration into the uncollapsed split of the backup ring. As a consequence of the foregoing, required gasket pressure is always achieved sequentially before lockup of the contained pipe such that displacement of the pipe ends is unnecessary to assure installation in the manner of the coupling of FIG. 1.

As disclosed in U.S. Pat. No. 4,569,542, both radial clearance W and axial clearance Y are critical in determining the sequential relationship sought to be achieved between the operation of lock ring 28 and the collapsed sealing of gasket 24. For normal on site assembly of a pipe joint utilizing the coupling of FIG. 2, a relationship is selected to enable a bolt tightening force of about 50 to 60 ft/lbs. Further tightening to the recommended 80 ft/lb. torque then moves the lock ring into final position while further increasing the gasket compression.

Figure 4:
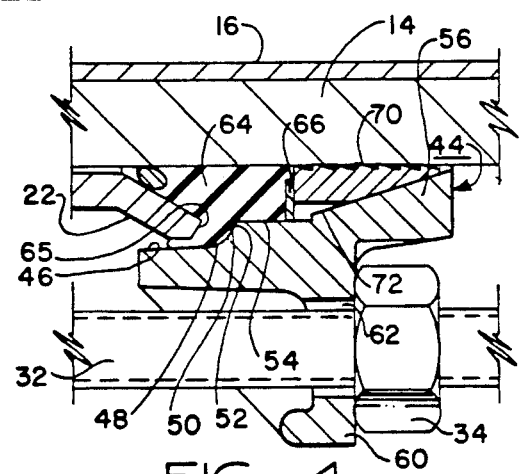
FIG. 4 is a fragmentary view of the end portion of FIG. 3 illustrating the post-installation relation of the components thereat.
Figure 3:
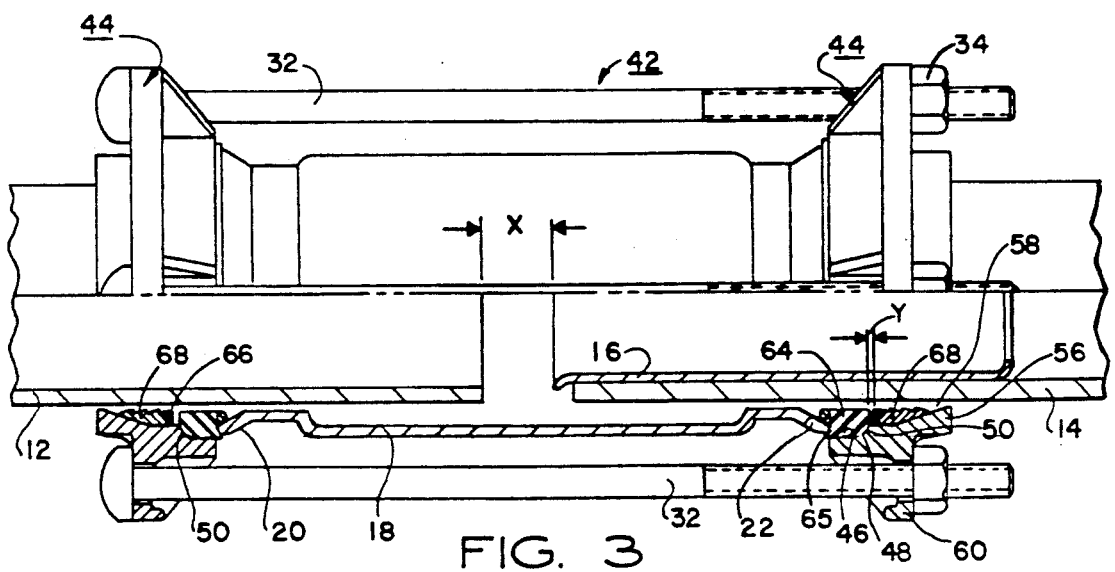
FIG. 3 is a view similar to FIG. 1 for the improved pipe coupling of the invention.

Referring now to FIGS. 3 and 4, there is illustrated a coupling designated 42 embodying the improvements of the invention. In this arrangement, the follower designated 44 is of an integral single wall structure formed as by welding or preferably by casting. Comprising the follower is an annular internal gasket seat 46 merging rearwardly via fillet 48 with a radial shoulder 50. The shoulder extends a partial dimension of gasket 64 thereat to effect an annular, radially inward protuberance 52 relative to a portion of gasket on seat 46 as will be described. The interior face of the protuberance comprises an annular sleeve-like bore 54 that joins rearwardly with frusto-conical tail 56 to define tapered opening 58. Integral circumferentially spaced radial lugs 60 include apertures 62 through which to receive the bolts 32.

For cooperating with the followers 44, there is provided at each end an annular elastomeric gasket 64 having an axially forward annular groove 65 in which to receive an end of middle ring 18. About its circumferentially outer and rear end face where seating is to occur on seat 46, the gasket is formed having a continuously smooth contour relatively configured to complement seat 46, fillet 48 and shoulder 50.

In the uncompressed relation of components as illustrated in FIG. 3, the backup ring 66 (like backup ring 26 supra) is positioned on the surface of bore 54 spaced a controlled dimension Y behind the confronting rear face of gasket 64. Tandemly contiguous behind the backup ring cradled at the intersection 72 between bore surface 54 and tail surface 56 is an arcuate gripper ring, here designated 68. The gripper ring includes interior teeth 70 and about its exterior for these purposes is of both circular and tapered section for initially overlying the internal intersection 72 of bore 54 with the frusto-conical internal taper of tail 56.

As the bolts 32 are tightened for drawing the followers 44 toward each other, compression of gasket 64 is initiated by protuberance 52 acting against the confronting surface of the gasket. Concomitantly, gap Y is consumed as the follower is advanced from the relaxed relation of FIG. 3 to the compressed relation of FIG. 4. During the course of installation, the gasket will begin to expand rearwardly against the backup ring 66 causing the gripper ring 68 to collapse as it is forced inwardly and rearwardly on the tapered ramp of tail 56. Eventually, teeth 70 of the gripper ring 68 will effect a penetration grip of the pipe ends 12 and 14 if of plastic composition or a more modest grip if of steel composition.

By the above description there is disclosed a novel and improved coupling construction affording distinct advantages and enhanced versatility of conditions where such couplings can be utilized as compared to similar purpose couplings of the prior art. By utilizing a unitary and integral cast follower having an internal axially effective protuberance, a solution to a longstanding problem has been resolved in a more reliable and more economical manner than heretofore.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. In a pipe coupling including a middle ring adapted to receive at least one pipe end to be coupled, an annular elastomeric gasket located to be intervening between an end of said middle ring and a pipe end received in said middle ring, a circumferentially collapsible lock ring axially outward of said gasket and effective when collapsed to grip the surface of the received pipe end for imposing an axial restraint thereon, a follower positioned to surround said lock ring and bolt and nut means engaging said follower and effective when tightened to advance said follower toward said end of said middle ring for compressing said gasket into a pressure seal between said end of the middle ring and pipe wall and for causing collapse of said lock ring into a restraining relation against, the received pipe end, the improvement comprising:

said follower having an internal surface defining at least a pair of axially contiguous annular seats of relatively different diameters, and a frustro-conical tapered lock ring ramp means, said annular seats being radially displaced by an intervening radial shoulder located intermediate said lock ring and the end of said middle ring, said first annular seat located near the end of said middle ring and said second annular seat of relatively reduced diameter axially extending from said shoulder and within which said lock ring is at least partially disposed; said relatively reduced diameter being sufficient to permit advancement of said second annular seat over said lock ring in the course of said follower being advanced by said bolt and nut means without collapsing said lock ring and said lock ring ramp means being axially spaced from said second seat and located further from said end for forcing said lock ring into collapsed engagement with the wall of said pipe in response to advancement of said follower;

said annular gasket being seated on said first annular seat and compressed by axial advancement of said shoulder;

said follower in response to tightening said bolt and nut means advancing said shoulder to engage and compress said gasket to achieve a pressure seal between the end of said middle ring and said pipe wall in response to a predetermined level of gasket compression occurring sequentially prior to said lock ring ramp means effecting completed collapse of said lock ring.

2. In a pipe coupling according to claim 1 in which said gasket when uncompressed on said first seat and said lock ring when uncollapsed within said second seat define a clearance of predetermined axial dimension Y intervening therebetween and said follower shoulder is effective in the course of said bolt and nut means being tightened to initiate compression of said gasket prior to collapse of said lock ring being initiated by said lock ring ramp means.

3. In a pipe coupling according to claim 1 in which the contour shape of the peripheral gasket surface when uncompressed is substantially complementary to the contour surface shape of said first annular seat to effect a substantial interfit relation therebetween.

4. In a pipe coupling according to claim 1, 2 or 3, in which said follower is of an integrally cast composition.

* * * * *